(12) United States Patent
Martinez

(10) Patent No.: US 7,002,453 B2
(45) Date of Patent: Feb. 21, 2006

(54) REMOTE LAMP STATUS DISPLAY VIA FIBER OPTIC SYSTEM

(75) Inventor: Anthony Edward Martinez, St. Augustine, FL (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 10/759,938

(22) Filed: Jan. 16, 2004

(65) Prior Publication Data

US 2005/0156749 A1   Jul. 21, 2005

(51) Int. Cl.
*B60Q 1/00* (2006.01)
*B60Q 1/22* (2006.01)
*G08B 21/00* (2006.01)
*F21V 5/00* (2006.01)
*F21V 7/04* (2006.01)

(52) U.S. Cl. .................. 340/438; 340/425.5; 340/458; 340/463; 340/641; 340/815.42; 340/468; 340/642; 362/555; 362/559; 362/583

(58) Field of Classification Search ................ 340/438, 340/425.5, 458, 463–468, 641–642, 815.42; 362/555, 583, 559
See application file for complete search history.

(56) References Cited

U.S. PATENT DOCUMENTS 5,515,028 A * 5/1996 Dittmar ...................... 340/458
6,867,704 B1 * 3/2005 Pellegrino .............. 340/815.45

FOREIGN PATENT DOCUMENTS

GB         2094965 A  *  9/1982

\* cited by examiner

*Primary Examiner*—Jeffery Hofsass
*Assistant Examiner*—Lam Pham
(74) *Attorney, Agent, or Firm*—Carr LLP; Diana R. Gerhardt

(57) ABSTRACT

A method and apparatus are provided for remotely monitoring the status of a variety of illumination devices. A fiber optic cable coupled to a light fixture transmits a light display. Based on the light received, the status of the light is determined. The status is determined without the use of elegant and expensive electronics that are more subject to failure and with minimal power consumption.

23 Claims, 5 Drawing Sheets

REMOTE LAMP STATUS DISPLAY VIA FIBER OPTIC SYSTEM

BACKGROUND OF THE INVENTION

1. Field of the Invention

The present invention relates generally to determining the status of a light or lamp and, more particularly, to remote determination of lamp or light status utilizing fiber optics.

2. Description of the Related Art

In both vehicles, both automotive and aircraft, and in various facilities, interior and exterior illumination has become increasingly important. However, in many cases, such as with vehicles, exterior illumination, especially exterior indicators like brake lights, are not visible to the operator or passengers. Also, in some cases, such as with amusement parks, there may be thousands upon thousands of lights used for illumination and for safety. In either case, it can be difficult, time consuming, or both to determine the status of the light or lamp.

Typically, certain electronics to measure the status of the lights or lamps are used. These measurement electronics operate in a variety of manners, such as, for example, measuring the resistance of the illumination device. The measurement electronics essentially interpret the state of the illumination device and report the state of the illumination device to a display.

The electronic interpretation techniques, elegant as they may be, do have a number of problems. For example, most systems do not correctly interpret intermittent operation or partial intensity. Also, these electronic interpretation techniques are highly subject to failure. Both examples may be very costly in terms of dollar value and human life if a failure were to occur on an aircraft. Also, with all electric measurements that correspond to these interpretation techniques, the electronics consume power. If there are number of illumination devices, then the power consumption can be quite large.

Therefore, there is a need for a method and/or apparatus to improve the measurement of operation of illumination devices that addresses at least some of the problems associated with conventional methods and apparatuses for measuring the operation of an illumination device.

SUMMARY OF THE INVENTION

The present invention provides a method and an apparatus for determining the status of an illumination device. Light is received from the illumination device by an optical fiber. The light is transmitted to a display, wherein the display displays the status of the illumination device based on the light.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by hardware, such as a computer or an electronic data processor, in accordance with code, such as computer program code, software, and/or integrated circuits that are coded to perform such functions, unless indicated otherwise.

Figure 1:
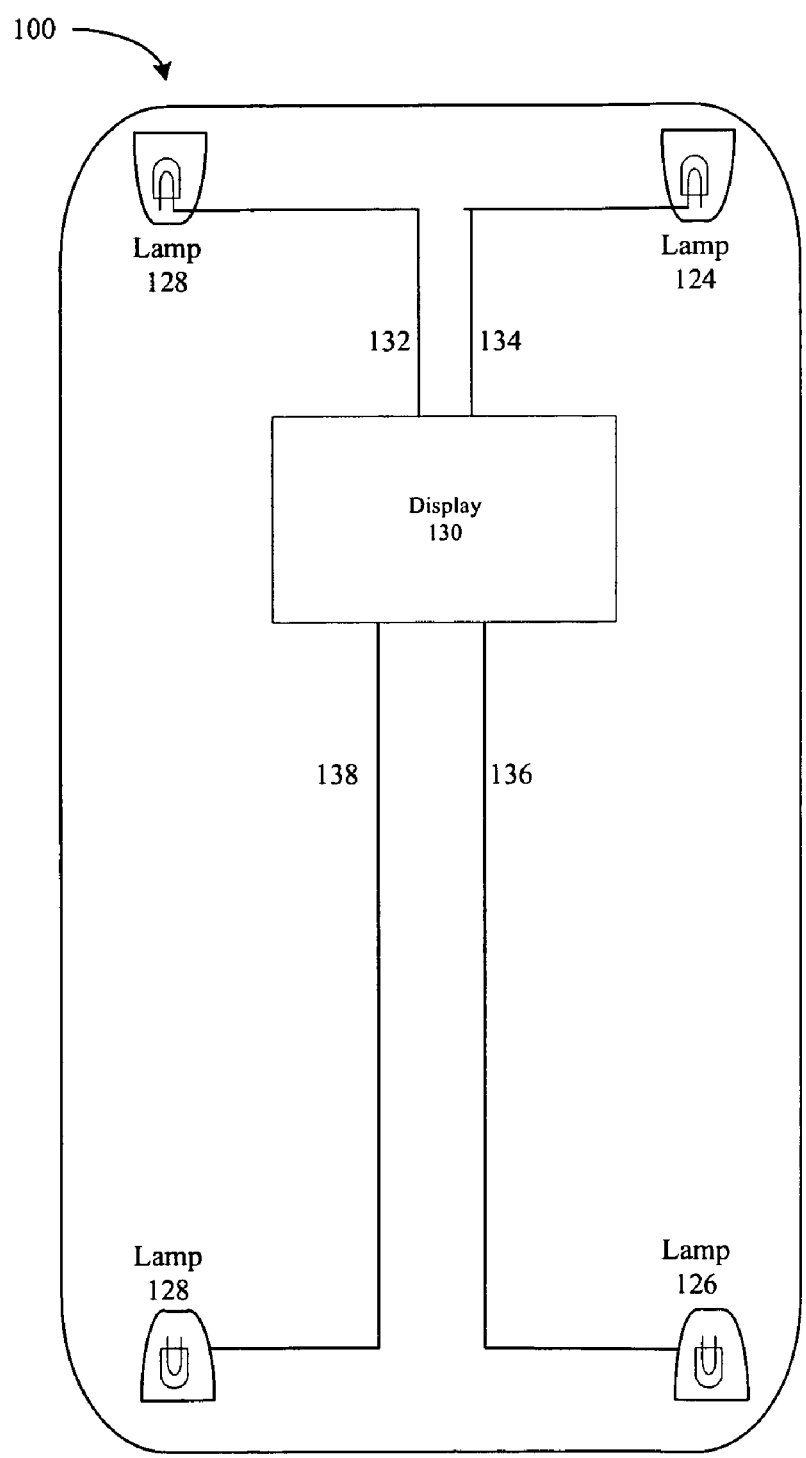
FIG. 1 depicts a block diagram of an automobile illumination system utilizing remote optical monitoring.

Referring to FIG. 1 of the drawings, the reference numeral 100 generally designates a block diagram of an automobile illumination system utilizing remote optical monitoring. The illumination system comprises a first lamp 122, a second lamp 124, a third lamp 126, a fourth lamp 128, and a display 130.

The operation of the illumination system 100 is based on light capture. As opposed to conventional systems that utilize elegant electronic measurement devices, the illumination system 100 captures light from each lamp or illumination element. A fiber optic cable or bundle is coupled to each lamp or illumination element. The fiber optical cable or bundle captures light from the lamp or illumination element and transmits the captured light to a display. From the captured light virtually no power is consumed, and there is instant feedback.

There are a variety of connections that exist in order for the illumination system 100 to operate. The first lamp 122 is coupled to the display 130 through a first optical fiber 132. The second lamp 124 is coupled to the display 130 through a second optical fiber 134. The third lamp 126 is coupled to the display 130 through a third optical fiber 136. The fourth lamp 128 is coupled to the display 130 through a fourth optical fiber 138. There are a number of optical fibers that can be utilized at a variety of diameters. Moreover, there can be multiple optical fibers or a single optical fiber, as shown in FIG. 1, coupled to each lamp.

Figure 2:
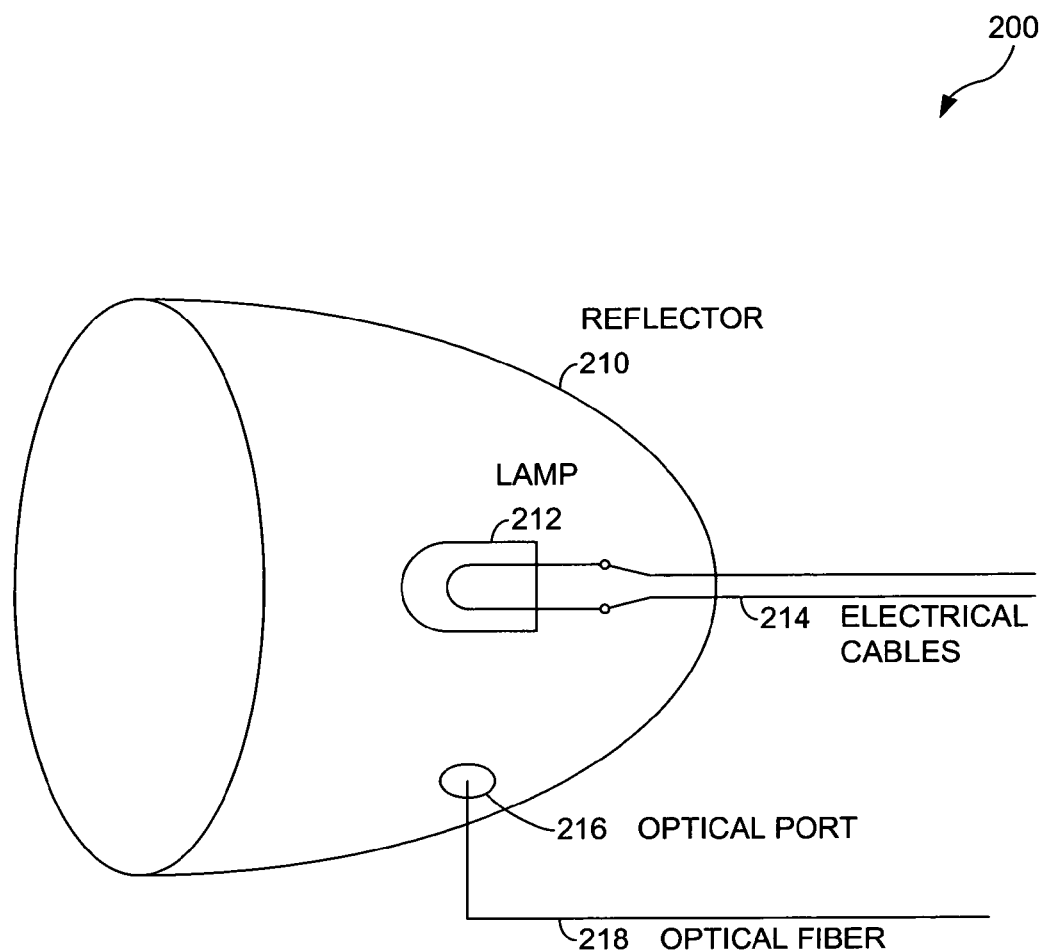
FIG. 2 depicts a block diagram a lamp equipped with a remote optical monitor.

Referring to FIG. 2 of the drawings, the reference numeral 200 generally designates a block diagram of a lamp equipped with a remote optical monitor. The lamp 200 comprises a reflector 210, electrical cables 214, an illumination element 212, an optical port 216, and an optical fiber 218.

Within the lamp 200, the reflector 210 operates as the housing for the lamp. The illumination element 212 rests at the focus of the parabolic reflector 210. The electrical cables 214 are then coupled to the illumination element 212 through an aperture in the reflector 210 to supply power to the illumination element 212. The illumination element 212 can be a number of devices, such as a Light Emitting Diode (LED) or a light bulb. Also, the reflector 210 can be one of a number of geometries, for example a paraboloid as shown in FIG. 2. Contained within the reflector 210, there is also an optical port 216. The optical port 216 can be located on any portion of the reflector 210 that would allow for light capture. An optical fiber 218 is then coupled to the optical port 216. The couple between the optical port 216 and the optical fiber 218 can be achieved through a variety of matter, for example a lens.

Figure 3:
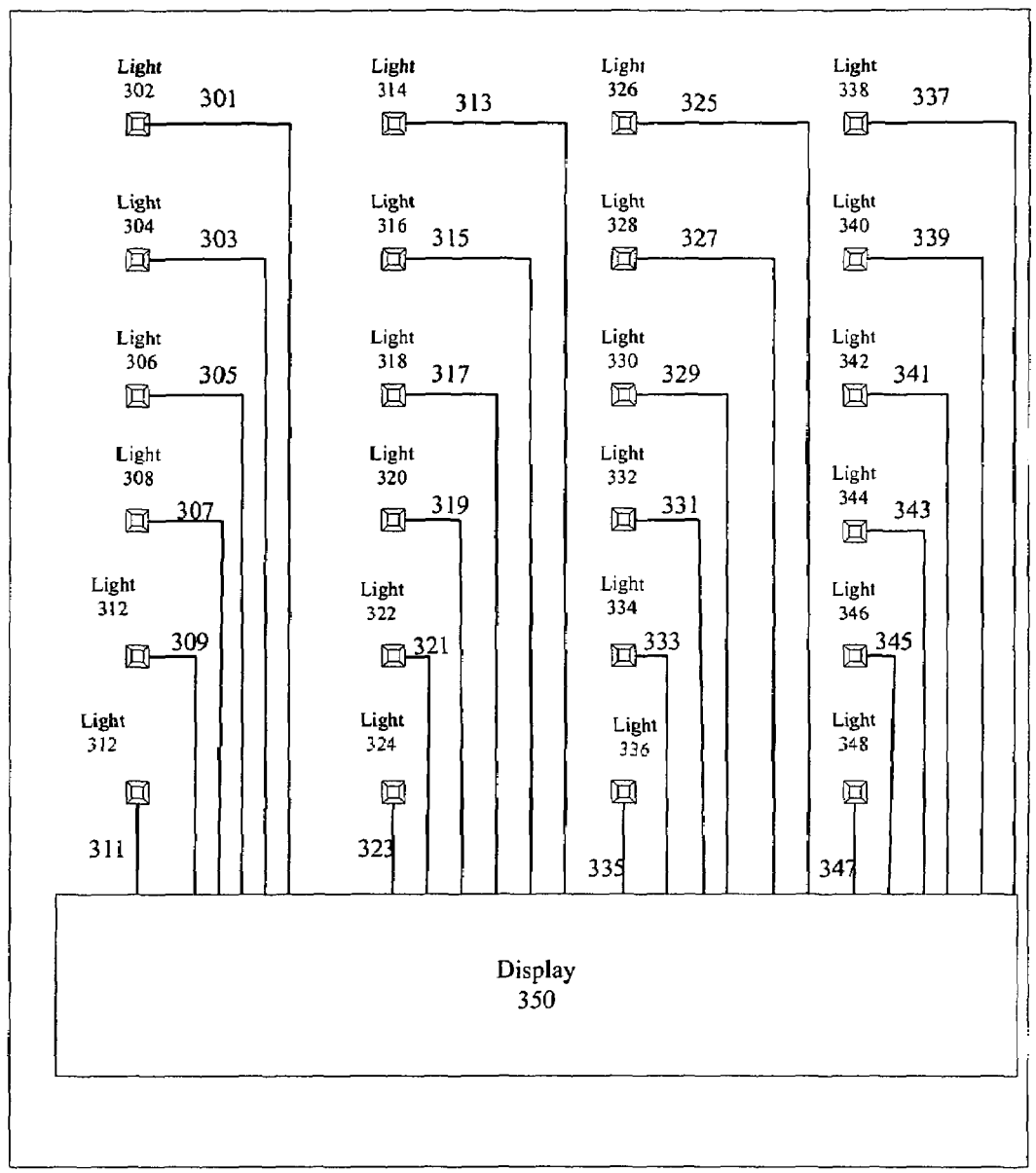
FIG. 3 depicts a block diagram of facility utilizing remote optical monitoring.

Referring to FIG. 3 of the drawings, the reference numeral 300 generally designates a block diagram of a facility utilizing remote optical monitoring. The facility 300 comprises a first light 302, a second light 304, a third light 306, a fourth light 308, a fifth light 310, a sixth light 312, a seventh light 314, an eighth light 316, a ninth light 318, a tenth light 320, an eleventh light 322, a twelfth light 324, a thirteenth light 326, a fourteenth light 328, a fifteenth light 330, sixteenth light 332, a seventeenth light 334, an eighteenth light 336, a nineteenth light 338, a twentieth light 340, a twenty-first light 342, a twenty-second light 344, a twenty-third light 346, a twenty-fourth light 348, and a display 350.

In order for the remote optical monitoring system to operate, light should be coupled to the display. The first light 302 is coupled to the display 350 through a first optical fiber 301. The second light 304 is coupled to the display 350 through a second optical fiber 303. The third light 306 is coupled to the display 350 through a third optical fiber 305. The fourth light 308 is coupled to the display 350 through a fourth optical fiber 307. The fifth light 310 is coupled to the display 350 through a fifth optical fiber 309. The sixth light 312 is coupled to the display 350 through a sixth optical fiber 311. The seventh light 314 is coupled to the display 350 through a seventh optical fiber 313. The eighth light 316 is coupled to the display 350 through an eighth optical fiber 315. The ninth light 318 is coupled to the display 350 through a ninth optical fiber 317. The tenth light 320 is coupled to the display 350 through a tenth optical fiber 319. The eleventh light 322 is coupled to the display 350 through an eleventh optical fiber 321. The twelfth light 324 is coupled to the display 350 through a twelfth optical fiber 323. The thirteenth light 326 is coupled to the display 350 through a thirteenth optical fiber 325. The fourteenth light 328 is coupled to the display 350 through a fourteenth optical fiber 327. The fifteenth light 330 is coupled to the display 350 through a fifteenth optical fiber 329. The sixteenth light 332 is coupled to the display 350 through a sixteenth optical fiber 331. The seventeenth light 334 is coupled to the display 350 through a seventeenth optical fiber 333. The eighteenth light 336 is coupled to the display 350 through an eighteenth optical fiber 335. The nineteenth light 338 is coupled to the display 350 through a nineteenth optical fiber 337. The twentieth light 340 is coupled to the display 350 through a twentieth optical fiber 339. The twenty-first light 342 is coupled to the display 350 through a twenty-first optical fiber 341. The twenty-second light 344 is coupled to the display 350 through a twenty-second optical fiber 343. The twenty-third light 346 is coupled to the display 350 through a twenty-third optical fiber 345. The twenty-fourth light 348 is coupled to the display 350 through a twenty-fourth optical fiber 347.

Also, there are a variety of configurations that can be utilized with a facility, such as the facility 300 of FIG. 3. There are a number of optical fibers that can be utilized at a variety of diameters. Moreover, there can be multiple optical fibers or a single optical fiber, as shown in FIG. 3, coupled to each light. There can be a single light or multiple lights, as shown in FIG. 3. The lights can also be of a variety of types and configurations, such as an overhead 40-watt incandescent bulb. The type of facility can also be one or more of a variety of facilities, such as a factory or an amusement park.

Figure 4:
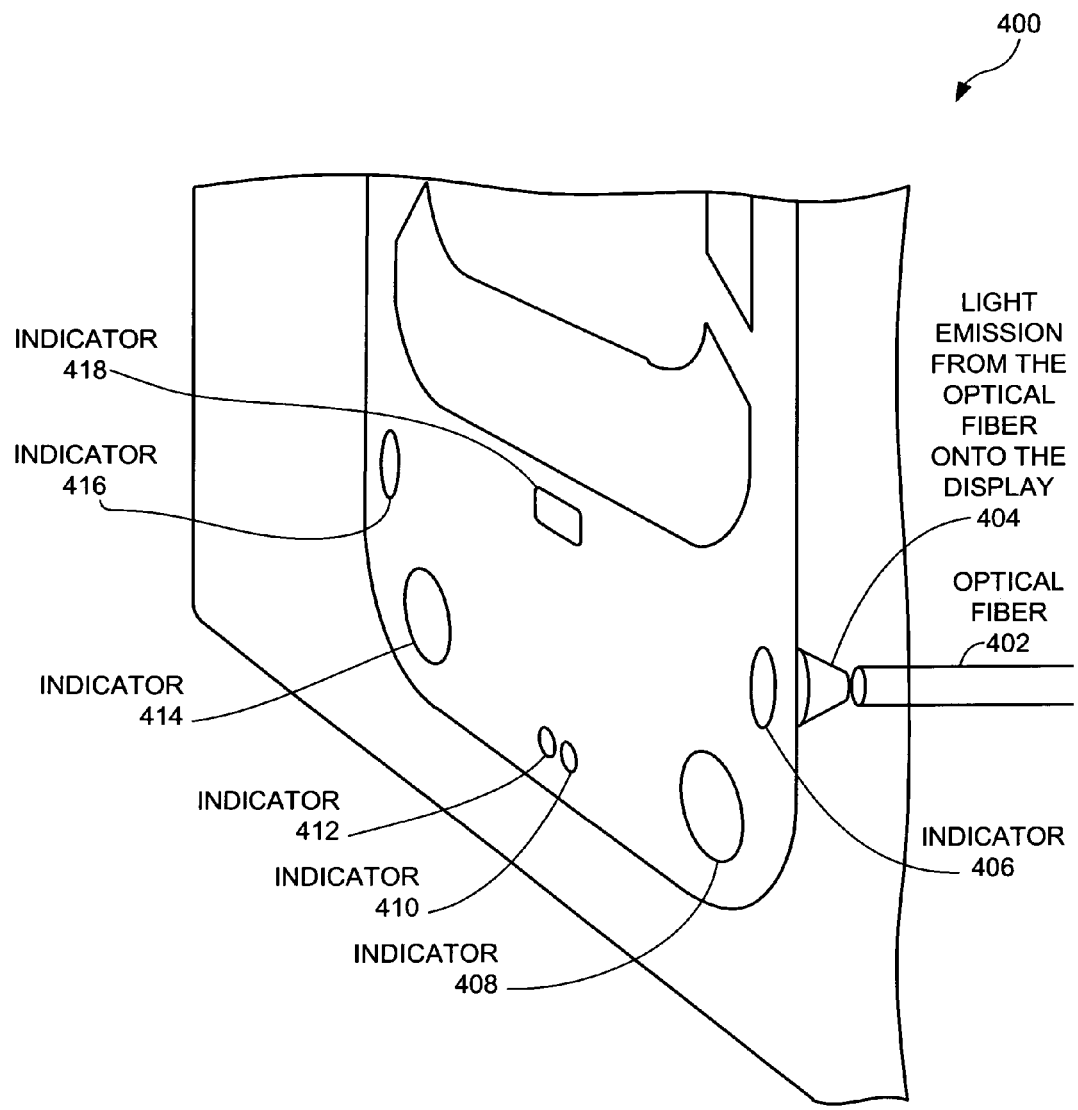
FIG. 4 depicts a block diagram a direct display of a remote optical monitoring system.

Referring to FIG. 4 of the drawings, the reference numeral 400 generally designates a block diagram depicting a direct display of a remote optical monitoring system. The direct display 400 comprises a first indicator 406, a second indicator 408, a third indicator 410, a fourth indicator 412, a fifth indicator 414, a sixth indicator 416, a seventh indicator 418, and an optical fiber 402.

The operation of the direct display 400 can be the least complex display utilizing remote optical monitoring. For each lamp on a given vehicle or facility, there is a corresponding optical fiber, such as optical fiber 402. The display pictorially shows the location of each lamp or illumination device. For each lamp or illumination device, there is an indicator on the display, such as the first indicator 406, a second indicator 408, a third indicator 410, a fourth indicator 412, a fifth indicator 414, a sixth indicator 416 and a seventh indicator 418. The fiber from each corresponding lamp directly couples to the indicator on the display, such as the optical fiber 402 coupling to the first indicator 406. Light 404 is then emitted from the fiber 402 directly to the first indicator 406. There are a variety of manners to couple a fiber to an indicator, such as a lens. There can also be multiple or a single optical fiber, as shown in FIG. 4 for each indicator.

Figure 5:
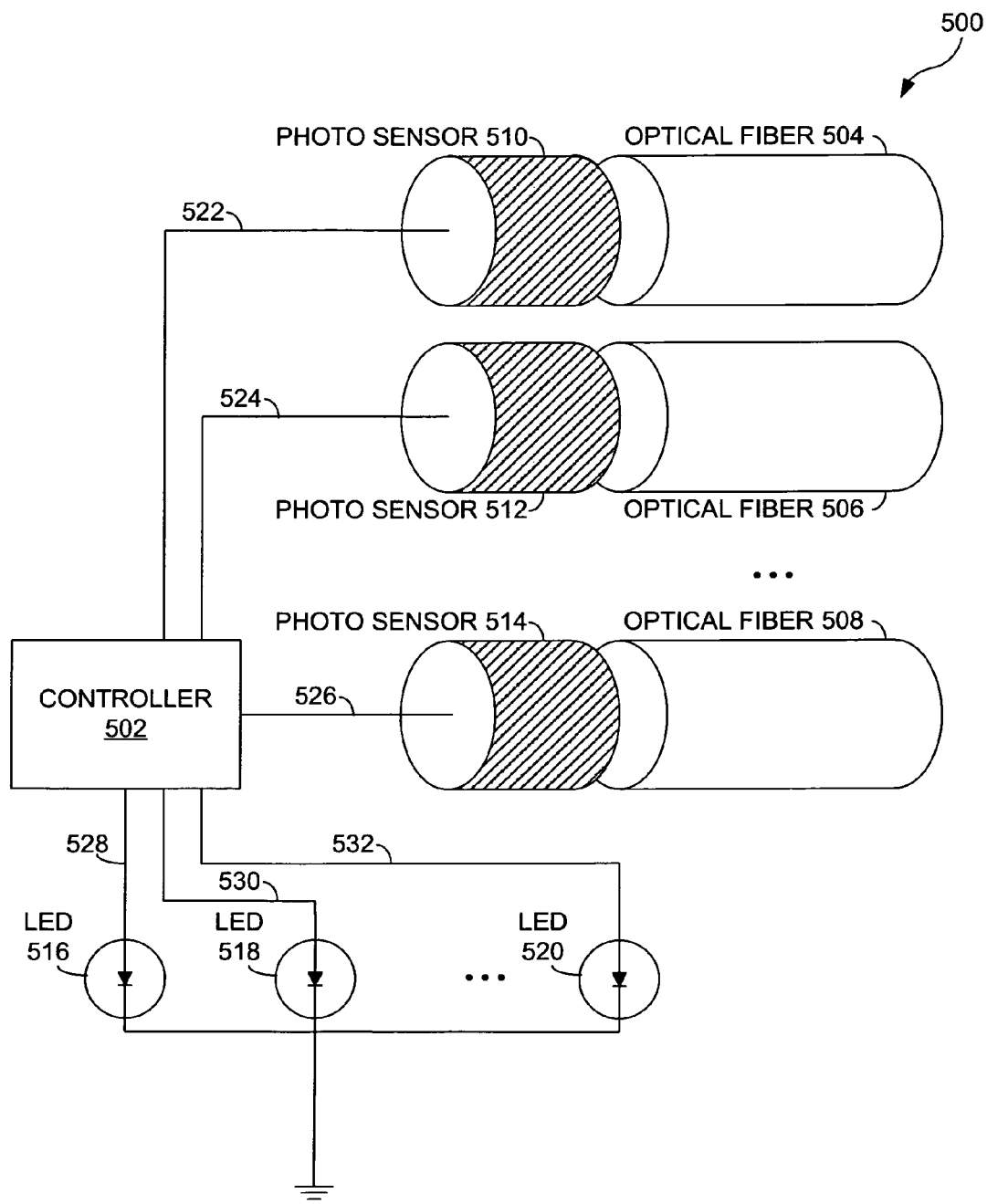
FIG. 5 depicts a block diagram a LED display of a remote optical monitoring system.

Referring to FIG. 5 of the drawings, the reference numeral 500 generally designates a block diagram depicting an LED display of a remote optical monitoring system. The LED display 500 comprises a first optical fiber 504, a second optical fiber 506, a third optical fiber 508, a first optical sensor 510, a second optical sensor 512, a third optical sensor 514, a controller 502, a first LED 516, a second LED 518, and a third LED 520. There should be at least one sensor, at least one LED, and at least one optical fiber for each illumination device or lamp that is monitored by the remote optical monitoring system.

The LED display 500 is a more advanced and elegant system for displaying the status of an illumination device or lamp. An optical fiber, such as the first optical fiber 504, feeds in light from an illumination device or lamp. A sensor, such as the first optical sensor 510, detects the light emitted from the optical fiber, such as the first optical fiber 504. A signal from the sensor, such as the first optical sensor 510, is then relayed to a controller, such as the controller 502. The controller, such as the controller 502, then can activate corresponding LED, such as the first LED 516.

Based on the signal that the controller receives from the optical sensor, there are a variety of outputs that the controller can produce. Based on color, intensity, and so forth, the controller can vary the output signal to the display. For example, if the illumination device is dual beam, then the controller can relay the intensity to the LEDs. Also, the LEDs can be replaced with a variety of other display devices such as a Liquid Crystal Display (LCD) shown in FIG. 5 to graphically display or provide a textual report of the status of the illumination device. The controller can also be equipped with a variety of other devices to draw attention to the display such as, for example, an audio prompt.

In order for the LED display to operate, the optical fibers should be coupled to the optical sensors. The first optical fiber 504 is optically coupled to the first optical sensor 510. The second optical fiber 506 is optically coupled to the second optical sensor 512. The third optical fiber 508 is optically coupled to the third optical sensor 514. Also, the optical fiber or fibers can be coupled to the optical sensor or sensors through a variety of ways, such as a lens. The optical fiber can be coupled to multiple optical sensors or to a single optical sensor, as shown in FIG. 5. Multiple optical fibers or a single optical fiber, as shown in FIG. 1, can be coupled to an optical sensor. Also, there can be a single optical sensor or multiple optical sensors, as shown in FIG. 5. Multiple optical sensors, as shown in FIG. 1, can be individually placed or placed into an array wherein optical fibers can be coupled thereto.

There should also be a variety of electrical connections established in order for the LED display to function. The first optical sensor 510 is coupled to the controller 502 through a first communication channel 522. The second optical sensor 512 is coupled to the controller 502 through a second communication channel 524. The third optical sensor 514 is coupled to the controller 502 through a third communication channel 526. The controller 502 is coupled to the first LED 516 through a fourth communication channel 528. The controller 502 is coupled to the second LED 518 through a fifth communication channel 530. Also, the controller 502 is coupled to the third LED 520 through a sixth communication channel 532. Moreover, any of the aforementioned communications channels would encompass wireless links, optical links, conductor cable links, packet switched channels, direct communication channels and any combination thereof.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for providing feedback, comprising;
   at least one illumination device;
   at least one optical fiber, wherein a first end of the at least one optical fiber at least configured to be coupled to the at least one illumination device to at least receive light; and
   a display, wherein the display further comprises:
      at least being coupled to a second end of the at least one optical fiber;
      at least being configured to receive light from the at least one optical fiber;
      at least being configured to report the status of the at least one illumination device based on the light received from the at least one optical fiber;
      at least one photoelectric detector at least configured to be coupled to the second end of the at least one optical fiber;
      a controller, wherein the controller is at least configured to receive at least one first signal from the photoelectric detector; and
      an output panel, wherein the output panel further comprises:
         at least configured to be coupled to the controller to at least receive at least one second signal from the controller; and
         at least one indicator at least configured to corresponding to the at least one illumination device.

2. The apparatus of claim 1, wherein the at least one illumination device further comprises a vehicle lamp or indicator.

3. The apparatus of claim 1, wherein the at least one illumination device further comprises a physical facility light.

4. The apparatus of claim 1, wherein the display is at least being configured to directly output the light from the at least one optical fiber to a user.

5. The apparatus of claim 1, wherein the output panel further comprises a plurality of Light Emitting Diodes (LEDs).

6. The apparatus of claim 1, wherein the output panel comprises a Liquid Crystal Display (LCD) to at least provide a textual prompt, graphical prompt, or combination thereof of the status of the illumination device.

7. The apparatus of claim 1, wherein the output panel comprises a Cathode Ray Tube (CRT) to at least provide a textual prompt, graphical prompt, or combination thereof of the status of the illumination device.

8. The apparatus of claim 1, wherein the display further comprises an audio prompt.

9. The apparatus of claim 1, wherein the display further comprises a plurality of photoelectric detectors at least configured to be organized into an array.

10. A method for determining the status of an illumination device, comprising:
    receiving light from an illumination device by an optical fiber;
    transmitting the light to a display, wherein the display displays the status of the illumination device based on the light; and
    wherein the display comprises:
       a photoelectric detector at least configured to be coupled to the second end of the at least one optical fiber;
       a controller, wherein the controller is at least configured to receive at least one first signal from the photoelectric detector; and
       an output panel, wherein the output panel further comprises:
          at least configured to be coupled to the controller to at least receive at least one second signal from the controller; and
          at least one indicator at least configured to correspond to the at least one illumination device.

11. The method of claim 10, wherein the method further comprises the display being at least configured to directly output the light from the at least one optical fiber to a user.

12. The method of claim 10, wherein the output panel further comprises a plurality of Light Emitting Diodes (LEDs).

13. The method of claim 10, wherein the output panel comprises a Liquid Crystal Display (LCD) to at least provide a textual prompt, graphical prompt, or combination thereof of the status of the illumination device.

14. The method of claim 10, wherein the output panel comprises a Cathode Ray Tube (CRT) to at least provide a textual prompt, graphical prompt, or combination thereof of the status of the illumination device.

15. The method of claim 10, wherein the display further comprises an audio prompt.

16. The method of claim 10, wherein the display further comprises a plurality of photoelectric detectors at least configured to be organized into an array.

17. A system, comprising:
    an illumination device;

an optical fiber comprising a first end and a second end, the first end coupled to the illumination device and configured to receive light from the illumination device;

a display coupled to the optical fiber, comprising:
  a photoelectric detector coupled to the second end of the optical fiber;
  a controller coupled to the photoelectric detector and configured to receive a first signal from the photoelectric detector and to generate a control signal in response to the received first signal; and
  an indicator coupled to the controller and configured to receive the control signal from the controller and to generate an output indication in response to the received control signal.

18. The system of claim 17, wherein the indicator comprises a Light Emitting Diode (LED).

19. The system of claim 17, wherein the display further comprises a Liquid Crystal Display (LCD) to at least provide a textual prompt, graphical prompt, or combination thereof representing the status of the illumination device in response to the output indication.

20. The system of claim 17, wherein the output indication comprises an audio prompt.

21. The system of claim 17, wherein the display further comprises a plurality of photoelectric detectors configured to be organized into an array.

22. The system of claim 17, wherein the illumination device comprises a vehicle light.

23. The system of claim 17, wherein the illumination device comprises a physical facility light.

* * * * *